(12) United States Patent
Muratov

(10) Patent No.: US 10,291,081 B2
(45) Date of Patent: May 14, 2019

(54) METHODS AND DEVICES FOR PROTECTION IN WIRELESS POWER SYSTEMS

(71) Applicant: MediaTek Inc., Hsin-Chu (TW)

(72) Inventor: Vladimir A. Muratov, Manchester, NH (US)

(73) Assignee: MediaTek Inc., Hsin-Chu (TW)

( * ) Notice: Subject to any disclaimer, the term of this patent is extended or adjusted under 35 U.S.C. 154(b) by 192 days.

(21) Appl. No.: 15/361,720

(22) Filed: Nov. 28, 2016

(65) Prior Publication Data

US 2017/0163101 A1    Jun. 8, 2017

Related U.S. Application Data

(60) Provisional application No. 62/262,878, filed on Dec. 3, 2015.

(51) Int. Cl.
*H02J 50/80* (2016.01)
*H02J 50/10* (2016.01)
*H02J 7/02* (2016.01)
*H02J 50/12* (2016.01)

(52) U.S. Cl.
CPC ............. *H02J 50/80* (2016.02); *H02J 7/025* (2013.01); *H02J 50/10* (2016.02); *H02J 50/12* (2016.02)

(58) Field of Classification Search
CPC ...................................................... H02J 50/80
USPC ............................................................ 307/104
See application file for complete search history.

(56) References Cited

U.S. PATENT DOCUMENTS

| | | | |
|---|---|---|---|
| 2010/0142509 A1 | 6/2010 | Zhu et al. | |
| 2013/0099585 A1* | 4/2013 | Von Novak | H01F 38/14 307/104 |
| 2013/0134927 A1 | 5/2013 | Park et al. | |
| 2014/0084856 A1 | 3/2014 | Howard et al. | |
| 2014/0333142 A1 | 11/2014 | Desrosiers | |
| 2017/0040846 A1* | 2/2017 | Sankar | H04B 5/0031 |

OTHER PUBLICATIONS

Extended European Search Report for Application No. EP 16201824.6 dated Apr. 7, 2017.

* cited by examiner

*Primary Examiner* — Joseph Chang
(74) *Attorney, Agent, or Firm* — Wolf, Greenfield & Sacks, P.C.

(57) ABSTRACT

A wireless power system and methods for operating the same are provided for protection of a wireless power receiver during wireless power transfer. A signal strength limit for the wireless power transmitter is determined based upon a receiver limit, a sensitivity of the wireless power receiver and a scaling factor of the wireless power transmitter.

17 Claims, 7 Drawing Sheets

METHODS AND DEVICES FOR PROTECTION IN WIRELESS POWER SYSTEMS

CROSS-REFERENCE TO RELATED APPLICATIONS

This application claims priority to U.S. provisional application Ser. No. 62/262,878, filed Dec. 3, 2015, titled "Over-Voltage Protection In Wireless power system Based On Normalized Information," which is hereby incorporated by reference in its entirety.

BACKGROUND

1. Technical Field

The techniques described herein relate generally to wireless power delivery, and particularly to overvoltage protection of a wireless power receiver.

2. Discussion of the Related Art

Wireless power systems (WPTS) are gaining increasing popularity as convenient way to deliver power without wires or connectors. WPTS currently under development in the industry can be separated in two major classes: magnetic induction (MI) systems and magnetic resonance (MR) systems. Both types of systems include a wireless power transmitter and a wireless power receiver. Such systems can be used to power or charge mobile devices such as smartphones or tablet computers, among other applications.

Inductive WPTS typically operate in an allocated frequency range of several hundred kilohertz using frequency variation as a power flow control mechanism.

MR WPTS typically operate on a single resonant frequency using input voltage regulation to regulate output power. In typical applications, MR WPTS operate at a frequency of 6.78 MHz.

Some wireless power systems include a wireless power transmitter and one or more wireless power receivers coupled to the wireless power transmitter. The one or more wireless power receivers receive electrical power from the wireless power transmitter. Each wireless power receiver and the wireless power transmitter may communicate between each other before, during and after wireless power transfer.

SUMMARY

Some embodiments relate to a wireless power receiver configured to communicate with a wireless power transmitter for receiving electrical power therefrom, the wireless power receiver comprising: at least one non-transitory computer-readable medium storing a limit of the wireless power receiver and a sensitivity of the wireless power receiver; and circuitry configured to: transmit the limit of the wireless power receiver and the sensitivity of the wireless power receiver to the wireless power transmitter for the wireless power transmitter to determine a signal strength limit for the wireless power transmitter; or receive a scaling factor from the wireless power transmitter and determine a signal strength limit for the wireless power transmitter based upon the scaling factor, the limit of the wireless power receiver and the sensitivity of the wireless power receiver, and transmit the signal strength limit for the wireless power transmitter to the wireless power transmitter.

The circuitry may be configured to transmit the limit of the wireless power receiver and the sensitivity of the wireless power receiver to the wireless power transmitter.

The circuitry may be configured to transmit the limit of the wireless power receiver and the sensitivity of the wireless power receiver to the wireless power transmitter prior to initiation of power transfer between the wireless power transmitter and the wireless power receiver.

The sensitivity may indicate a sensitivity of the wireless power receiver to a magnetic field.

The sensitivity may be represented relative to a that of a reference wireless power receiver.

The wireless power receiver may be configured to receive a scaling factor from the wireless power transmitter and determine a signal strength limit for the wireless power transmitter based upon the scaling factor, the limit of the wireless power receiver and the sensitivity of the wireless power receiver.

The limit of the wireless power receiver and the sensitivity may be stored together in a single byte.

The limit may be a voltage limit, a current limit or a temperature limit of the wireless power receiver.

Some embodiments relate to a method performed by a wireless power receiver, the method comprising: (A) storing a limit of the wireless power receiver and a sensitivity of the wireless power receiver; (B) transmitting the limit of the wireless power receiver and the sensitivity of the wireless power receiver to a wireless power transmitter for the wireless power transmitter to determine a signal strength limit for the wireless power transmitter; or receiving a scaling factor from the wireless power transmitter and determining a signal strength limit for the wireless power transmitter based upon the scaling factor, the limit of the wireless power receiver and the sensitivity of the wireless power receiver, and transmitting the signal strength limit to the wireless power transmitter; and (C) receiving power wirelessly from the wireless power transmitter based upon the signal strength limit.

Some embodiments relate to a wireless power transmitter configured to communicate with a wireless power receiver for transmitting electrical power thereto, the wireless power transmitter comprising: at least one non-transitory computer-readable medium storing a scaling factor, and circuitry configured to limit a signal strength of the wireless power transmitter to a value determined based on the scaling factor, a limit of the wireless power receiver and a sensitivity of the wireless power receiver.

The wireless power transmitter may be configured to receive the limit of the wireless power receiver and the sensitivity of the wireless power receiver from the wireless power receiver.

The wireless power transmitter may be configured to calculate the value based on the scaling factor, the limit of the wireless power receiver and the sensitivity of the wireless power receiver.

The wireless power transmitter may be configured to receive the limit of the wireless power receiver and the sensitivity of the wireless power receiver prior to initiation of power transfer between the wireless power transmitter and the wireless power receiver.

The limit of the wireless power receiver and the sensitivity may be received together in a single byte.

The scaling factor may be represented relative to that of a reference wireless power transmitter.

The limit may be a voltage limit, a current limit or a temperature limit of the wireless power receiver.

Some embodiments relate to a method performed by a wireless power transmitter, the method comprising: storing a scaling factor, and limiting a signal strength of the wireless power transmitter to a value determined based on the scaling factor, a limit of a wireless power receiver and a sensitivity of the wireless power receiver.

The foregoing summary is provided by way of illustration and is not intended to be limiting.

BRIEF DESCRIPTION OF THE DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Figure 1:
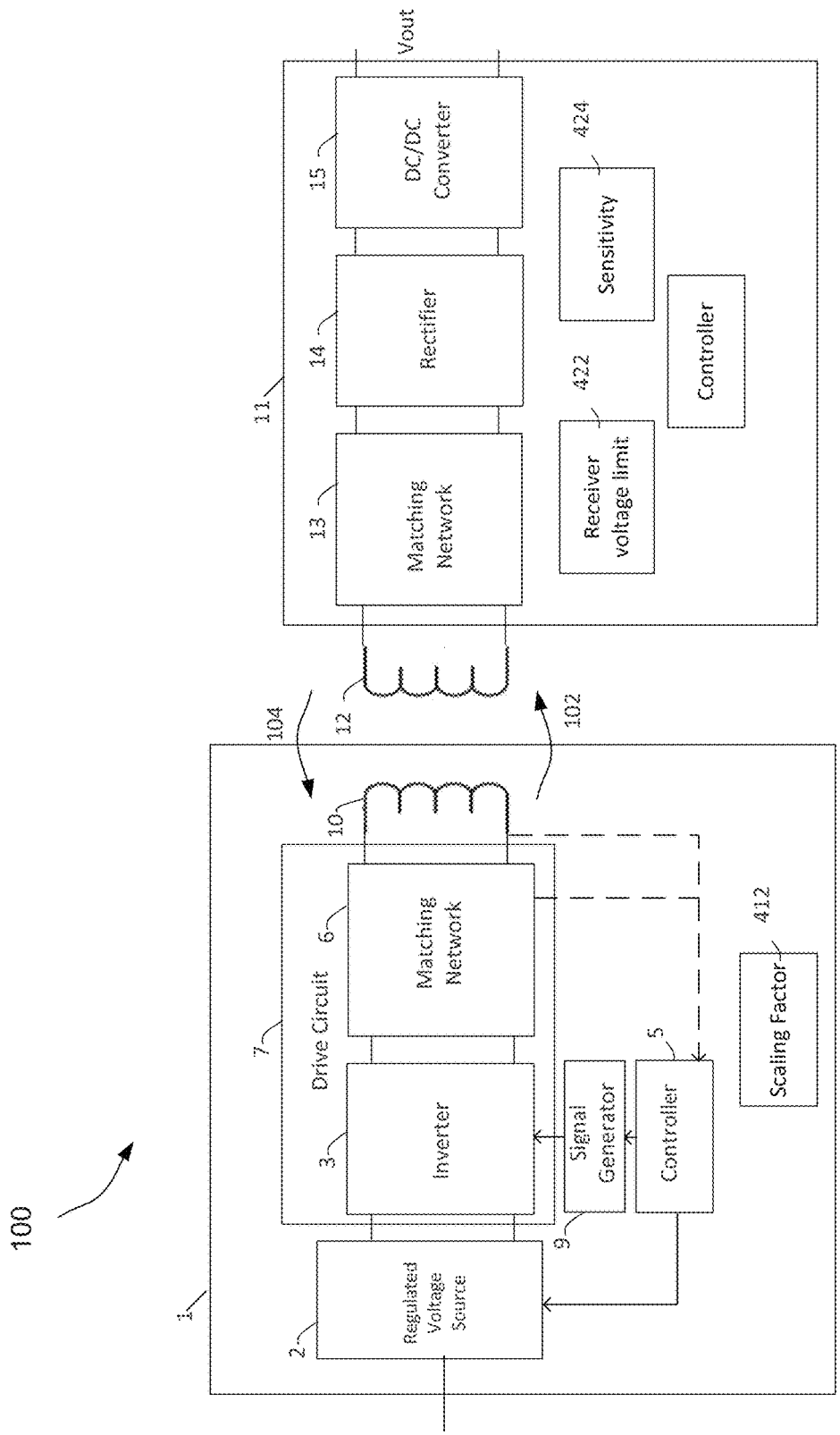
FIG. 1 shows a wireless power system according to some embodiments.

Aspects of the present application provide for protection for a wireless power receiver of a wireless power system. Some aspects relate to over-voltage protection. Under certain conditions, a wireless power receiver may be exposed to a high magnetic field from the wireless power transmitter that produces an excessively high voltage in the wireless power receiver. If the voltage in the wireless power receiver exceeds a voltage limit for the receiver, this is termed an "over-voltage" condition. An over-voltage condition may cause damage to one or more components of the receiver and/or otherwise may adversely affect performance of the wireless power receiver. However, the techniques described herein are not limited to over-voltage protection for the wireless power receiver, as in some cases the wireless power receiver may be protected by preventing an over-current condition, a temperature of the wireless power receiver that exceeds a threshold, or any other limiting parameter of the wireless power receiver. Exceeding such limiting parameters may cause damage to the wireless power receiver. Examples are described below that relate to over-voltage protection, however, it should be appreciated that such techniques may be used to avoid exceeding any one or more limiting parameters of the wireless power receiver.

To avoid producing an over-voltage condition in the wireless power receiver, the signal strength produced by the wireless power transmitter may be limited. However, since there exist a variety of different wireless power transmitters and wireless power receivers having different characteristics, there is no single limit that is appropriate for all combinations of wireless power transmitters and wireless power receivers. For example, different wireless power receivers may have different voltage limits, and may have receiver coils with different sizes and/or number of turns which leads to a different sensitivity to magnetic fields. Accordingly, some wireless power receivers may tolerate a higher magnetic field than others. Further, different wireless power transmitters may have transmit coils of different shapes, sizes and/or number of turns which may lead to different field strengths for the same transmitted power level.

In some embodiments, a wireless power transmitter may set a limit on the strength of the wireless power signal it transmits based on characteristics of the wireless power transmitter and wireless power receiver. The wireless power transmitter and wireless power receiver each may store information regarding one or more of their characteristics, such as those discussed above. This information may be used to calculate or otherwise determine a limit on the strength of the wireless power signal produced by the wireless power transmitter to avoid an overvoltage condition in the receiver. For example, the receiver may send its characteristics to the transmitter, and the transmitter may calculate the signal strength limit. Alternatively, the transmitter may send its characteristics to the receiver, and the receiver may calculate or otherwise determine the signal strength limit and send it to the transmitter. The wireless power transmitter then controls wireless power transfer to avoid exceeding the signal strength limit.

FIG. 1 shows a high level block diagram of a wireless power system 100. As shown in FIG. 1, wireless power transmitter 1 may communicate to wireless power receiver 11 via link 102. Wireless power receiver 11 may also communicate to wireless power transmitter 1 via link 104. Links 102 and 104 may be in band or out of band communication links implemented by any suitable communication circuitry. Any suitable communication protocol may be used for transmitting information via links 102 and 104 between transmitter 1 and receiver 11. Via links 102 and/or 104, information may be exchanged for establishing, controlling and/or terminating the wireless power transfer. For example, the wireless power receiver 11 may send information to the wireless power transmitter 1 regarding a load on the wireless power receiver 11. As discussed further below, wireless power transmitter 1 and wireless power receiver 11 may exchange information regarding their capabilities via link 102 and/or 104 to allow calculation of the signal strength limit of the wireless power transmitter 1 to avoid overvoltage of the wireless power receiver 11.

As shown in FIG. 1, the wireless power transmitter 1 has a drive circuit 7 including an inverter 3 that drives a transmit coil 10 through a matching network 6. The wireless power transmitter 1 may include a regulated voltage source 2 (e.g., a voltage regulator) that provides a regulated DC voltage to the inverter 3. The regulated voltage source 2 produces a regulated DC output voltage in response to control stimulus from the controller 5. In some embodiments, the drive circuit 7 may be a class D or E amplifier that converts the DC voltage at the input of inverter 3 into an AC output voltage to drive the transmit coil 10. Producing an AC output voltage enables wireless power transmission through electromagnetic induction. The controller 5 may control a signal generator 9 to drive the inverter 3 with signals of a selected wireless power transmission frequency. As an example, the inverter 3 may be switched at a frequency between 100 and 205 kHz to transmit power to a wireless power receiver designed to receive wireless power according to the Qi specification for low power Qi receivers and 80-300 kHz for medium power Qi receivers. The inverter 3 may be switched at a higher frequency, such as a frequency of greater than 1 MHz, within an ISM band, e.g., 6.765 MHz to 6.795 MHz, to transmit power to a receiver designed to receive wireless power using MR technology. However, these frequencies are described merely by way of example, as wireless power may be transmitted at a variety of suitable frequencies, in accordance with any suitable specification. Controller 5 may be an analog circuit or a digital circuit. Controller 5 may be programmable, and may command signal generator 9 to produce signals at a desired transmission frequency based on stored program instructions, so that inverter 3 switches at the desired transmission frequency. Matching network 6 may facilitate wireless power delivery by presenting a suitable impedance to the inverter 3. The matching network(s) may have one or more capacitive or inductive elements or any suitable combination of capacitive and inductive elements. Since the transmit coil 10 may have an inductive impedance, in some embodiments the matching network 6 may include one or more capacitive elements, which, when combined with the impedance(s) of the transmit coil 10, presents an impedance to the output of inverter 3 suitable for driving the transmit coil 10. In some embodiments, during wireless power transfer the resonant frequency of the matching network 6 may be set equal to or approximately equal to the switching frequency of the inverter 3. The transmit coil 10 may be realized by any suitable type of conductors. The conductors may be wires, including solid wire or Litz wire, or patterned conductors, such as patterned conductors of a PC board or an integrated circuit.

The AC current in the transmit coil 10 generates an oscillating magnetic field in accordance with Ampere's law. The oscillating magnetic field induces an AC voltage into a receiver coil 12 of the wireless power receiver 11 in accordance with Faraday's law. The AC voltage induced in the receiver coil 12 is provided through a matching network 13 to a rectifier 14 that generates an unregulated DC voltage. Rectifier 14 may be a synchronous rectifier or may be implemented using diodes. The unregulated DC voltage is regulated using a DC/DC converter 15, the output of which may be filtered and provided to a load as output voltage Vout. In some alternate embodiments the DC/DC converter 15 can be replaced by a linear regulator or battery charger, or eliminated altogether.

The amplitude of AC voltage in the receiver coil 12 of the wireless power receiver 11 is dependent on the amplitude of the AC output voltage driving the transmit coil 10 of the wireless power transmitter 1, as well as a coupling coefficient between the transmit coil 10 and the receiver coil 12. For example, when the wireless power receiver 11 is in close proximity to the wireless power transmitter 1, there is higher a higher coupling between them. This results in a AC voltage in the receiver coil 12 of larger amplitude. Conversely, when the wireless power receive 11 is farther away, the coupling is reduced and the AC voltage in the receiver coil 12 is reduced.

The inventors have recognized and appreciated that overvoltage protection is desired when the wireless power system operates over a wide range of coupling coefficients due to spatial freedom of the receivers and transmitters. For example, a wireless power receiver may move closer to and farther away from the transmit coil of a wireless power transmitter coupled to the receiver during power transfer, leading to varying coupling coefficients. The inventors have recognized and appreciated that fast changes in coupling coefficient especially from weak coupling to strong coupling can result in excessive voltage in the wireless power receiver 11.

In one exemplary scenario, a mobile device with a wireless power receiver may be placed on a table top to be recharged wirelessly by a wireless power transmitter coil embedded in the table. A user may change the position of the device and reduce the coupling coefficient between the transmit coil and receiver coil, such as by picking it up to write a text message while the mobile device is being charged wirelessly. When the mobile device is charging away from the table surface, the mobile device senses a reduction in received power from the degradation of coupling coefficient and communicates with the transmitter controller such that the transmitter can increase its output current to the transmit coil in order for the received power to return to its nominal value to continue charging the mobile device. If the user puts the mobile device back down on the table surface resulting in a fast increase in the coupling coefficient, the transmitter coil output current may not react instantly and may still remain at a high current level for charging the mobile device at a greater distance for a short duration of time, which may lead to a transient increase of voltage received at the receiver coil that may cause an over-voltage condition.

To illustrate the exemplary over-voltage scenario described above, FIG. 2 shows a data plot 300 illustrating operating points of an exemplary wireless power system according to some aspects of the present application. Data plot 300 shows a series of operating points 301–305 along a plurality of load lines 310, 320, 330 and 340 showing the relation of receiver coil voltage $V_{RXin}$ as functions of receiver output current $I_o$ in an exemplary wireless power system. Each load line of load lines 310, 320, 330 and 340 represents the relation between $V_{RXin}$ and $I_o$ when the transmitter is configured with a transmission frequency F1, F2, F3 and F4, respectfully. In some embodiments, the controller 5 of a wireless power transmitter 1 according to the example shown in FIG. 1 may control signal generator 9 to produce signals to drive inverter 3 at a desired transmission frequency. In some scenarios, a coupling coefficient K between the transmitter and receiver may vary due to for example relocation of the receiver relative to the transmitter and the transmission frequency may be adjusted accordingly to optimize transmission efficiency.

Figure 2:
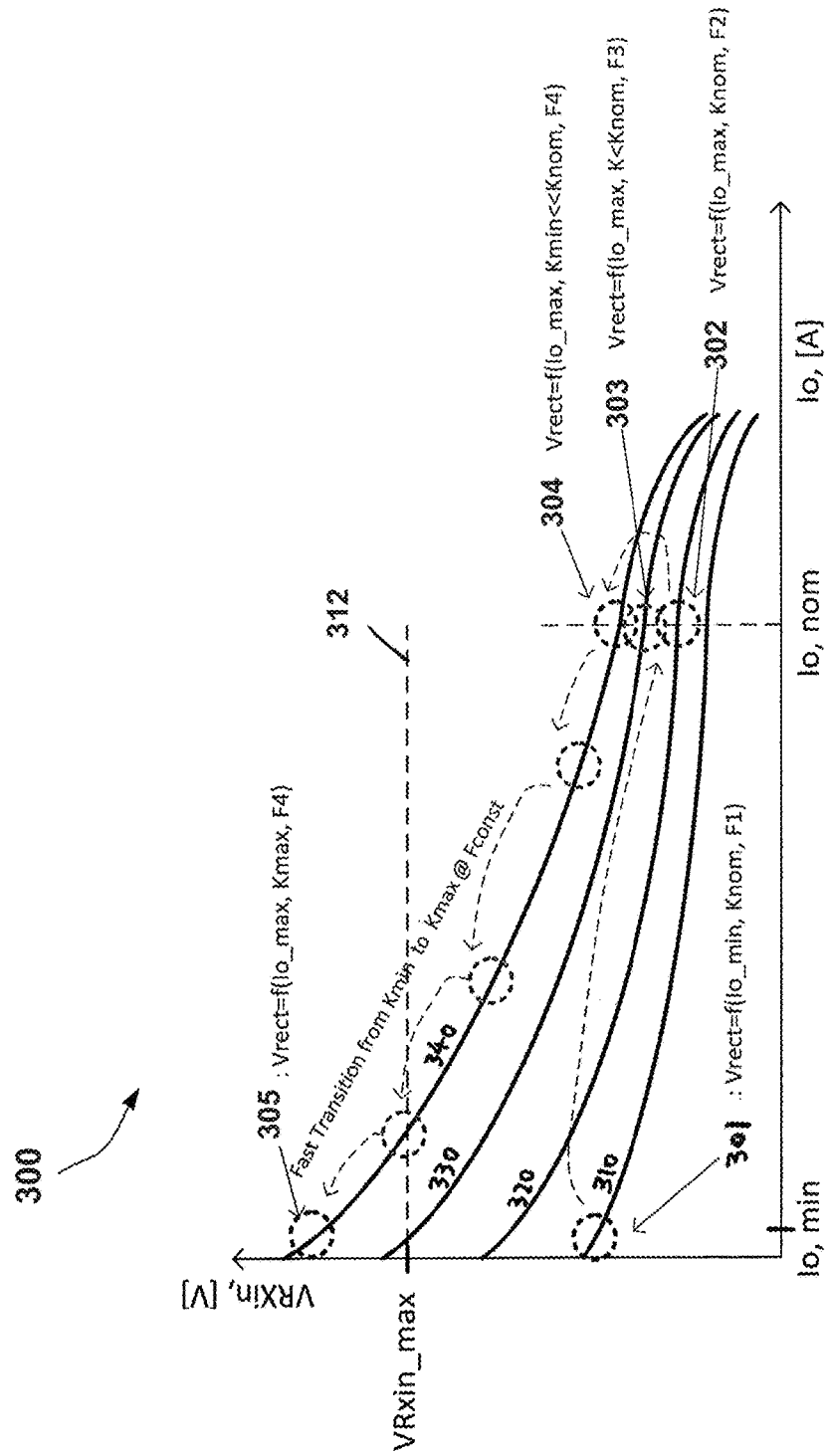
FIG. 2 shows a data plot illustrating operating points of an exemplary wireless power system.

Within each load line, it should be appreciated from FIG. 2 that when the receiver output current $I_o$ increases, the receiver coil voltage $V_{RXin}$ generally decreases. This general trend is similar to the load line current-voltage behavior of a load resistor connected to a constant voltage source with a serial internal source resistance, where a reduction in the load resistor's resistance generally results in a shift of operating point towards higher output current and lower output voltage on the load resistor.

In an exemplary scenario, a mobile phone is placed directly on a charger housing a wireless power transmitter. Operating point 301 represents a low output current $I_{O,min}$, prior to charging initiates, with a nominally high coupling coefficient $K_{nom}$ between a wireless power receiver within the mobile phone and the wireless power transmitter. When the mobile phone initiates charging, the operating point of the wireless receiver shifts to 302 on the load line 320 corresponding to a high output current $I_{O,max}$ in order to charge the mobile phone, and still with a high coupling coefficient $K_{nom}$. A user proceeds to pick up the mobile phone away from the charger, leading to a reduction in coupling coefficient to a value $K<K_{nom}$ and causing the operating point to shift to 303 on load line 330, corresponding to an increase of receiver coil voltage $V_{RXin}$. As the mobile phone is moved further away from the charger leading to a further reduction of coupling coefficient to a value $K_{min}<<K_{nom}$, the operating point shifts to 304 on load line 340. At the instant when the user puts the mobile phone back on the charger, the coupling coefficient rapidly increases from $K_{min}$ back up to the level $K_{nom}$, while the charging system remains on load line 340 with transmission frequency F4 for a brief period of time before reacting to the coupling coefficient increase. Due to the change of coupling coefficient, the apparent impedance of the receiver to the transmitter also rapidly changes at the instant such that from output current $I_o$ in the receiver reduces from $I_{O,max}$. As a result, the operating point shifts from operating point 304 rapidly to 305 on the same load line 340 and the rapid reduction of output current $I_o$ corresponds to an increased receiver coil voltage $V_{RXin}$ value that may exceed a voltage limit 312 and causes damage to components inside the receiver.

In another scenario, when a receiver is coupled to receive power from a transmitter to provide electrical power to a receiver load, such as charging a rechargeable battery from the receiver, a drop of the load may cause the operating point to shift from a high receiver current, low receiver voltage operating point similar to 304 into a low current, high voltage operating point similar to 305 on the same load line as shown in FIG. 2, when the load line hasn't had time to adjust to the changing load condition. The sudden upshot of receiver voltage may lead to over-voltage condition from the instant of the load drop.

In some embodiments, the wireless power transmitter and wireless power receiver may store information that can be used to determine a signal strength limit at the wireless power transmitter to avoid an over-voltage condition in the wireless power receiver. As illustrated in FIG. 1, wireless power receiver 11 may store a receiver voltage limit 422. The receiver voltage limit may be a maximum voltage amplitude of the AC voltage in the receiver coil 12, of a voltage in matching network 13 and rectifier 14, or a maximum voltage value of a DC voltage in rectifier 14 and DC/DC converter 15. It should be appreciated that although a voltage limit is described here, an any suitable electrical characteristics within the wireless receiver 11 may be used to indicate the voltage limit, such as a maximum current limit or maximum electromagnetic field strength. The receiver voltage limit 422 may be represented in memory in any suitable way. The receiver voltage limit 422 may be stored in a non-transitory computer readable storage medium of the wireless power receiver 11, such as memory or register, for example.

Wireless power receiver 11 may store a sensitivity 424, which may be information indicative of the sensitivity of the wireless power receiver to a magnetic field. The sensitivity 424 may represent the sensitivity of a reference wireless power receiver to the magnetic field produced by a reference transmitter at a standardized operating condition. In some embodiments, the sensitivity 424 may be a sensitivity "grade" of the wireless power receiver on any suitable scale, an example of which is discussed below. The sensitivity 424 may be stored in a non-transitory computer readable storage medium of the wireless power receiver 11, such as memory or register, for example In some embodiments, wireless power transmitter 1 stores a scaling factor 412, which may be information indicative of the strength of the magnetic field produced by the wireless power transmitter 1 under a predetermined operating condition, such as predetermined transmit power, voltage, etc. The scaling factor 412 may be representative of a ratio of the strength of the magnetic field produced by the wireless power transmitter 1 in the predetermined operating condition to that of a reference wireless power transmitter. However, scaling factor 412 need not be a relative indication of the strength of the magnetic field produced by the wireless power transmitter 1 under a predetermined operating condition, as in some embodiments scaling factor 412 may be an absolute indication, such as a transmitter strength "grade" on any suitable scale.

Figure 3:
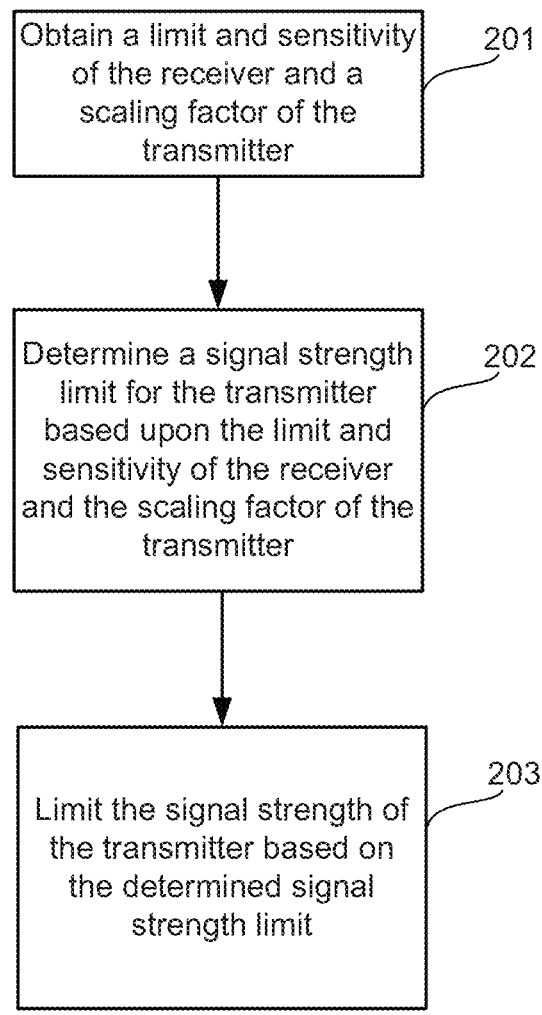
FIG. 3 shows an over-voltage protection method, according to some embodiments.

FIG. 3 shows an over-voltage protection method, according to some embodiments.

In step 201, a receiver voltage limit and sensitivity of the receiver and a scaling factor of the transmitter are obtained. Step 201 may be performed either by the wireless power transmitter 1 or the wireless power receiver 11.

If performed by the wireless power transmitter 1, step 201 may include the wireless power receiver 11 transmitting the stored receiver voltage limit 422 and sensitivity 424 to the wireless power transmitter 1, which then receives this information. The wireless power transmitter 1 may look up the stored scaling factor 412.

If performed by the wireless power receiver 11, step 201 may include the wireless power transmitter 1 transmitting the scaling factor to the wireless power receiver 11, and the wireless power receiver 11 then receiving this information. The wireless power receiver 11 may look up the receiver voltage limit 422 and sensitivity 424.

In step 202, a signal strength limit for the wireless power transmitter is determined based upon the receiver voltage limit and sensitivity of the receiver and the scaling factor of the transmitter. This allows an appropriate signal strength limit for the wireless power transmitter to be set depending on the characteristics of the wireless power transmitter 1 and wireless power receiver 11. The determination may be made by the same device (e.g., wireless power transmitter 1 or wireless power receiver 11) that obtains the information in step 201. The signal strength limit may be calculated by a processor of the wireless power transmitter 1 or wireless power receiver 11 based on the receiver voltage limit and sensitivity of the receiver and the scaling factor of the transmitter. For example, in some embodiments, the determination may be based on the sensitivity s, the scaling factor sf of the transmitter, and the receiver voltage limit $V_{RX}^{Max}$. In one non-limiting example, the signal strength limit of the wireless power receiver may be a power limit calculated as $V_{RX}^{Max} \times s \times sf$. To enforce the signal strength limit, a voltage and/or current limit may be set based upon the power limit, in some embodiments.

In step 203, the signal strength of the wireless power transmitter is limited based upon the signal strength limit determined step 202. If the limit is determined by the wireless power transmitter 1 in step 202 it may use this information to prevent a signal strength of the wireless power transmitter 1 from exceeding the limit. For example, the wireless power transmitter may set a limit on one or more electrical parameters of the inverter 3, such as voltage, current, and/or power. If the limit is determined by the wireless power receiver 11 in step 202 it may transmit the limit to the wireless power transmitter 1 for use in limiting the signal strength of the wireless power transmitter 1.

Figure 4:
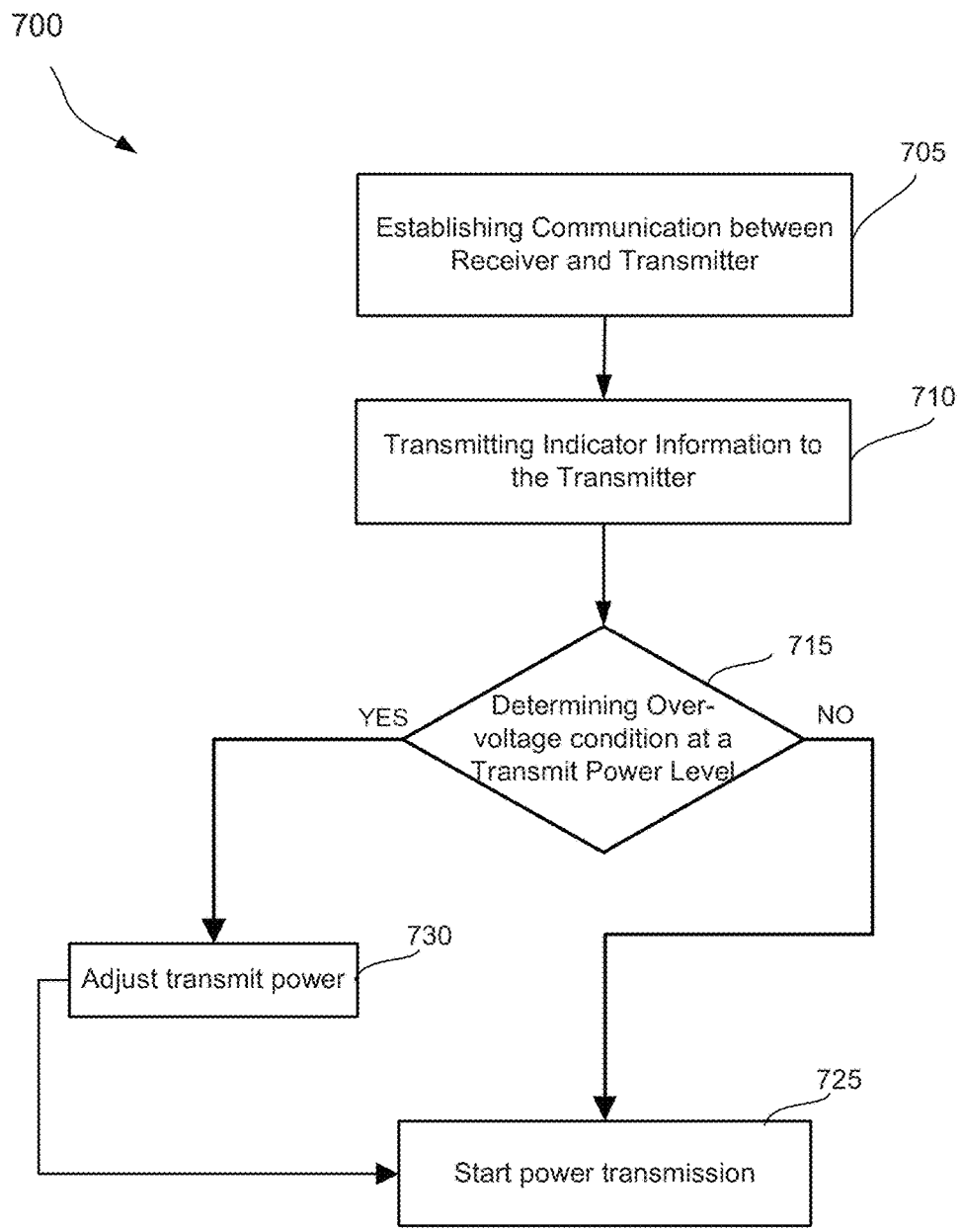
FIG. 4 shows a flow chart illustrating a process during the power transfer operation of an exemplary power transfer system according some embodiments.
Figure 7:
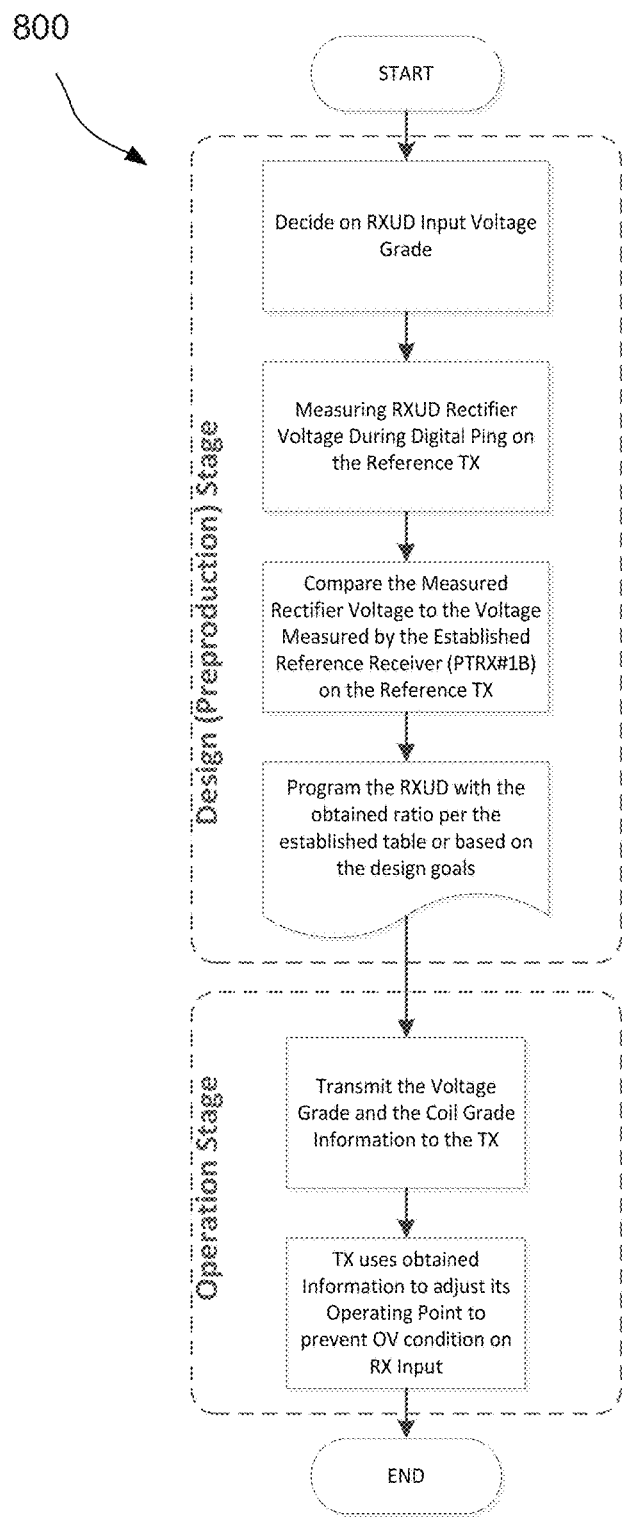
FIG. 7 shows a flow chart illustrating a process during the design stage and operating stage of an exemplary power transfer system according some embodiments.

FIG. 4 shows a flow chart illustrating a process 700 during the power transfer operation of an exemplary power transfer system according some embodiments. In the exemplary process 700 as shown in FIG. 7, at step 705, a communication between a receiver and a transmitter is established. At step 710, the receiver transmits the receiver voltage limit and sensitivity to the transmitter. At step 715, the transmitter uses the receiver voltage limit and sensitivity and a scaling factor stored in the transmitter to determine whether an over-voltage condition at the receiver would happen. In some embodiments, at step 715 the transmitter determines whether a preset or default output power level of the transmitter would result in levels of receiver voltage exceeding the voltage limit of the receiver based on the receiver voltage limit and sensitivity obtained from the receiver. In some embodiments, the determination is based on a combination of the sensitivity grade sg in the indicator information with the scaling factor sf of the transmitter, in view of the receiver voltage limit $V_{RX}^{Max}$. In one non-limiting example, a safe transmitter output power level limit may be determined by $V_{RX}^{Max} \times sg \times sf$. At step 725, when a determination is made that the transmitter will not cause over-voltage under the preset or default operational limits, the system commences power transmission. Alternatively at step 730, when a determination is made that the transmitter's preset output levels may cause over-voltage, the transmitter may make an adjustment to lower its power output such that the receiver will stay below the over-voltage condition and the system may proceed to step 725 to commence power transmission.

As should be appreciated from the example above, if for example $V_{RX}^{Max}=60$ V and sg=1.2 are transmitted to the transmitter from the receiver as indicator information, while the transmitter sf=0.1 Watt/Volt, the transmitter may compute a safe transmitter output power level limit of 60×1.2× 0.1=7.2 Watt.

Figure 5:
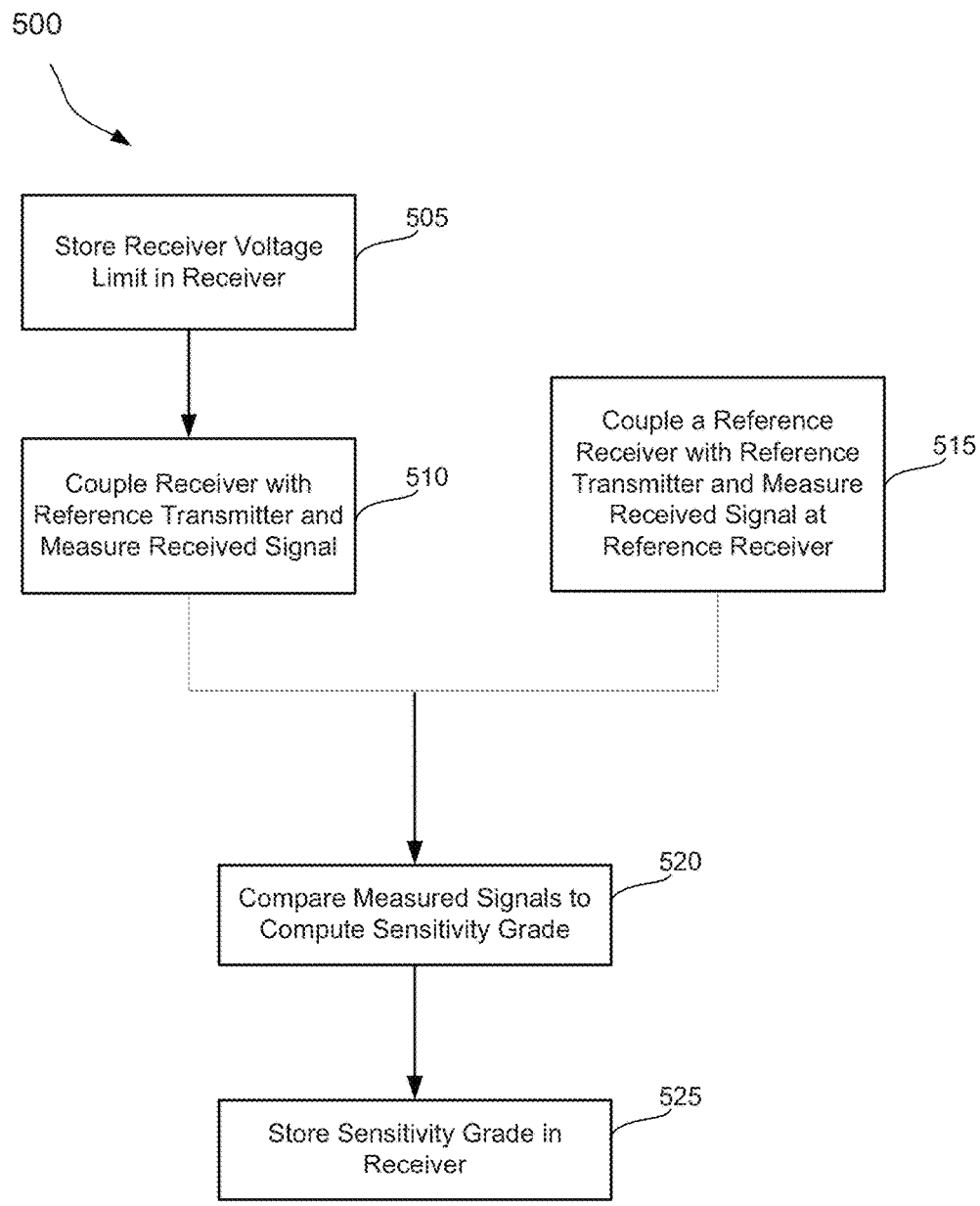
FIG. 5 shows a flow chart illustrating a process for calibrating a receiver according some embodiments.

FIG. 5 shows a flow chart illustrating a process 500 for calibrating a receiver according some embodiments. In the exemplary process 500 as shown in FIG. 5, at step 505, a receiver voltage limit is stored in a receiver. The receiver voltage limit may be obtained in many suitable ways, such as from voltage level limits from a number of internal components of the receiver, or from testing. At step 510, the receiver is coupled to a reference transmitter in order to determine the sensitivity of the receiver. At a standardized operating condition such as a preset operating frequency, distance and at the maximum output field strength setting of the transmitter, a received signal such as a coil voltage in the receiver may be measured in response to the reference transmitter. The standardized operating condition during calibration of the receiver may be any suitable condition representative of operation of the wireless power system, for example with the reference transmitter set to a maximum field strength and with the transmit coil lined up on the center axis with the receiver coil and spaced a set distance apart. At step 515, a reference receiver is put through the same standardized operating condition with the reference transmitter and a received signal is measured in the reference receiver. At step 520, the received signals at the receiver to be calibrated and at the reference receiver is compared to compute the sensitivity. In some embodiments, the sensitivity is the ratio of the measured receiver voltage to that of the reference receiver in response to the reference transmitter output at the same operating conditions. At step 525, the sensitivity is stored in the receiver. The calibration process 500 may be performed at any point prior to operation of the receiver during wireless power transfer. For example, process 500 may be performed during manufacturing of the wireless power receiver.

As an non-limiting example of process 500 in an exemplary power transfer system, a manufacturer of a receiver may determine that a receiver coil voltage amplitude of more than 60 V would result in damage to components in the receiver and stores in the receiver a receiver voltage limit $V_{RX}^{Max}=60$ V as part of the manufacturing process. The manufacturer may also perform a calibration to determine a sensitivity grade by comparing a measured receiver coil voltage in response to output power levels from a reference transmitter at the same standardized operating condition during calibration, with a measured coil voltage from a reference receiver when coupled to the reference transmitter at the same condition. The standardized operating condition during calibration of the receiver may be for example with the reference transmitter set to a known output field strength $P_{TX\_ref}^{Cal}$ and with the transmit coil lined up on the center axis with the receiver coil and spaced a set distance apart. As an example, the result of the calibration may show that the receiver coil voltage is $V_{RX}^{Cal}=1.2$ V for the receiver being calibrated while the reference receiver's coil voltage shows $V_{RX\_ref}^{Cal}=1$ V at the same condition in response to output field strength $P_{TX\_ref}^{Cal}$ of the reference transmitter, the sensitivity grade is sg=$V_{RX}^{Cal}/V_{RX\_ref}^{Cal}=1.2$ or 120%. The manufacturer may store the sensitivity grade in the receiver as part of the indicator information.

Although specific signals and unit of a voltage signal are disclosed in the example above, it should be appreciated that they are for illustrative purpose only as other suitable signals or values may be used as the receiver voltage limit and sensitivity. For example, the receiver voltage limit may be indicated by a receiver rectifier voltage level, a power level limit or a current limit in the receiver, with any suitable value and units such as Volt, Ampere, dB, dBm. In some embodiments, the standard operating condition includes a standardized load impedance such as 100 Ohm attached to the output of the receiver during each of the calibration process.

Figure 6:
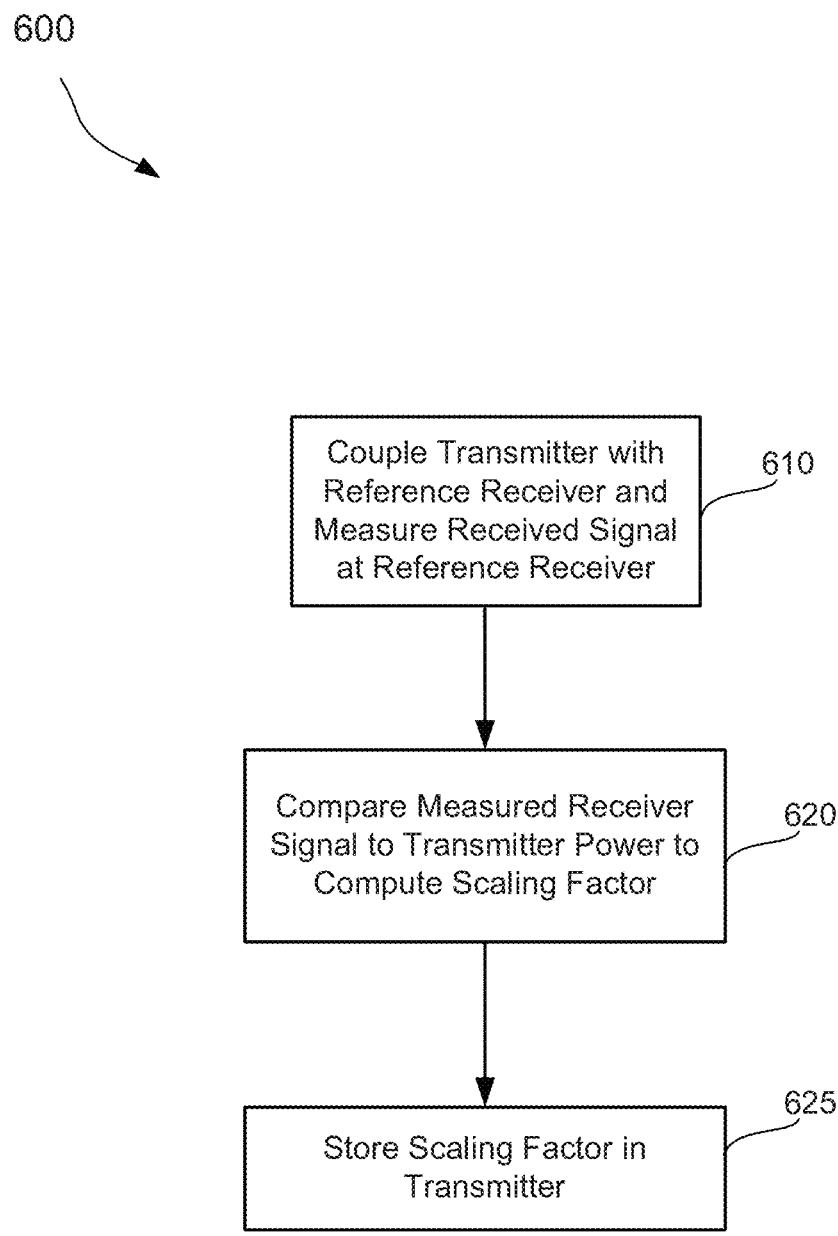
FIG. 6 shows a flow chart illustrating a process for calibrating a transmitter according some embodiments.

FIG. 6 shows a flow chart illustrating a process 600 for calibrating a transmitter according to some embodiments. In the exemplary process 600 as shown in FIG. 6, at step 610, the transmitter is coupled to a reference receiver in order to calibrate the relative output strength of the transmitter and how much power in the transmitter would result in a particular signal level at a reference receiver. At a standardized operating condition such as a preset operating frequency, distance between transmitter and receiver coils, a received signal such as a coil voltage in the reference receiver is measured in response to a particular power output level of the transmitter. At step 620, a scaling factor is computed by for example dividing the received signal amplitude at the reference receiver over the power output level of the transmitter to be calibrated. At step 625, the scaling factor is stored in the transmitter. The calibration process 600 may be performed at any point prior to operation of the receiver during wireless power transfer. As an example, process 600 may be performed during manufacturing of the wireless power transmitter. In some embodiments, processes 500 and 600 may be performed during certification tests of wireless power transmitter and receiver products.

As an non-limiting example of process 600 in an exemplary power transfer system, during the manufacturing process a manufacturer of a transmitter may calibrate a transmitter relative to a reference receiver at the standardized operating condition. In this example, a receiver coil voltage $V_{RX\_ref}^{Cal}=10$ V is measured in response to an output power of $P_{TX}^{Cal}=1$ Watt from the transmitter to be calibrated. Therefore a scaling factor of sf=$P_{TX}^{Cal}/V_{RX\_ref}^{Cal}=0.1$ Watt/ Volt may be assigned and stored in the transmitter. It should be appreciated that although the transmitter is calibrated against a reference receiver in the example above, a reference receiver is not required. To calibrate a transmitter's scaling factor, the transmitter may be compared to a reference transmitter when coupled with a same test receiver under the same conditions. A comparison of how much output power level in the transmitter being calibrated and the reference transmitter would result in the same amount of receiver signal would provide a relative output capability of the transmitter against the reference transmitter. For example, it may be determined that the transmitter is twice as efficient compared to a reference transmitter when the transmitter delivers the same receiver coil voltage in a test receiver is reached while using only 50% of the output power as a reference transmitter. If the scaling factor of the reference transmitter against a reference receiver is known, such as $sf_{ref}=0.05$ Watt/Volt, then the scaling factor of the transmitter to be calibrated may be determined as $sf=2\times sf_{ref}=0.1$ Watt/Volt.

FIG. 7 shows a flow chart illustrating a process 800 during the design stage and operating stage of an exemplary power transfer system according some embodiments. In the exemplary process 800, the following steps may be performed at the design stage:

Establishing receiver maximum allowed voltage capabilities;
Establishing the reference power receiver;
Establishing the reference power transmitter;
Establishing the reference voltage generated in reference power transmitter when operated with the said reference power receiver and registering the reference power transmitter operating conditions, the standardized operating conditions;
Calibrating the being manufactured wireless power receiver by measuring and registering its input voltage on the reference power transmitter in the said registered operating conditions and registering the relative difference in the measured voltage to the voltage measured by the reference receiver;
Comparing the desired maximum receiver input voltage with the known reference receiver maximum voltage and registering the relative difference;
Programming the being manufactured wireless power receiver with obtained receiver relative maximum voltage and the relative difference in receiver input voltages at the standardized operating conditions when powered by the said reference transmitter.

Further in the exemplary process 800, the following steps may be performed at operating conditions when the transmitter establishes initiation field strength and the receiver establishes communication link with the said transmitter but before the power transfer stage:

Transmitting from the manufactured receiver to the transmitter information about the receiver relative to the reference receiver maximum allowed input voltage;
Transmitting from the manufactured receiver to the transmitter information about the receiver relative to reference receiver voltage the appears at the manufactured receiver at standardized operating conditions;
Registering in a transmitter received information for the whole duration or some parts of power delivery mode of the said transmitter;
Repeating steps of transmitting the said relative information every time when the new power transmission sessions begins;

Still in the exemplary process 800, the following steps may be performed at the power transfer stage: in the transmitting device use obtained relative information about the engaged receiver maximum voltage capability and its capability of generating input voltage on the standard receiver to control the transmitter operating conditions in the way that the engaged power receiver maximum input voltage never develops.

Table 1 shows an exemplary list of receiver voltage limits that may be stored in a wireless power receiver. In the examples in Table 1, the receiver voltage limit may be a Voltage Grade as shown in the second column, each Voltage Grade is associated with a Break Voltage value from 10 to 60 V. As shown in Table 1, each Voltage Grade may be expressed in three bits of information. It may be transmitted as a portion of a byte in order to save transmission bandwidth and power when a receiver communicates the indicator information to a transmitter.

TABLE 1

Exemplary list of receiver voltage limits.

| # | Voltage Grade | Break Voltage, [V] |
|---|---|---|
| 1 | 0 | 10 |
| 2 | 1 | 15 |
| 3 | 10 | 20 |
| 4 | 11 | 25 |
| 5 | 100 | 30 |
| 6 | 101 | 40 |
| 7 | 110 | 50 |
| 8 | 111 | 60 |

Table 2 shows an exemplary list of sensitivity grades. In some embodiments, the sensitivity grade may be a relative coil grade representing the relative receiver coil sensitivity indicating to a transmitter how the receiver's ability to capture and transfer electromagnetic field into the rectifier voltage compares to a reference receiver. In the examples in Table 2, the column relative coil grade has values of a ratio corresponding to a range from 330% to 20% with 10% steps, of which eight entries represent relative sensitivity grade lower than 100% or when the sensitivity of the receiver is lower than the reference receiver. The neutral position of 100% sensitivity grade represents when the receiver being calibrated behaves substantially the same as the reference receiver in terms of received voltage in response to a reference transmitter under standardized operating conditions. The third column shows that the relative coil grade values may each be represented by five bits of information.

TABLE 2

1 Exemplary list of sensitivity grade

| # | | | Relative Coil Grade |
|---|---|---|---|
| 1 | −8 | 0 | 0.20 |
| 2 | −7 | 1 | 0.30 |
| 3 | −6 | 10 | 0.40 |
| 4 | −5 | 11 | 0.50 |
| 5 | −4 | 100 | 0.60 |
| 6 | −3 | 101 | 0.70 |
| 7 | −2 | 110 | 0.80 |
| 8 | −1 | 111 | 0.90 |
| 9 | 0 | 1000 | 1.00 |
| 10 | 1 | 1001 | 1.10 |
| 11 | 2 | 1010 | 1.20 |
| 12 | 3 | 1011 | 1.30 |
| 13 | 4 | 1100 | 1.40 |
| 14 | 5 | 1101 | 1.50 |
| 15 | 6 | 1110 | 1.60 |
| 16 | 7 | 1111 | 1.70 |
| 17 | 8 | 10000 | 1.80 |
| 18 | 9 | 10001 | 1.90 |
| 19 | 10 | 10010 | 2.00 |
| 20 | 11 | 10011 | 2.10 |
| 21 | 12 | 10100 | 2.20 |
| 22 | 13 | 10101 | 2.30 |
| 23 | 14 | 10110 | 2.40 |
| 24 | 15 | 10111 | 2.50 |
| 25 | 16 | 11000 | 2.60 |
| 26 | 17 | 11001 | 2.70 |

TABLE 2-continued

1 Exemplary list of sensitivity grade

| # | | | Relative Coil Grade |
|---|---|---|---|
| 27 | 18 | 11010 | 2.80 |
| 28 | 19 | 11011 | 2.90 |
| 29 | 20 | 11100 | 3.00 |
| 30 | 21 | 11101 | 3.10 |
| 31 | 22 | 11110 | 3.20 |
| 32 | 23 | 11111 | 3.30 |

Table 3 shows an exemplary data structure for storing and/or transmitting the receiver voltage and sensitivity. In the example in Table 3, a shared byte can be used to address Input Voltage and Receiver coil Sensitivity Grade where three bits are used for Input Voltage Grade and Five bits are used for Receiver Sensitivity Grade.

TABLE 3 exemplary data structure for the indicator information

| Coil Grade | | | | | Voltage Grade | | |
|---|---|---|---|---|---|---|---|
| b7 | b6 | b5 | b4 | b3 | b2 | b1 | b0 |
| c4 | c3 | c2 | c1 | c0 | v2 | v1 | v0 |

Table 4 shows exemplary Coil Relative Scaling data for several receivers when coupled to a reference transmitter. In the example in Table 4, the transmitter MP-A1 is used as a reference transmitter and operates in digital ping ½-bridge mode and 175 kHz as the standardized operating condition. Power receiver Example 1 (PREX1) coil is used as a Qi reference receiver coil. The receiver rectifiers are loaded with a load resistance of 100 Ohm.

TABLE 4

Exemplary Coil Relative Scaling data

| TX | RX | Measured VRECT, [V] | Ratio to PREX1 | Closest Standard | Code |
|---|---|---|---|---|---|
| MP-A1 | PREX1 | 7.62 | 1.00 | 1.00 | 01000 |
| | MPRX#1A | 6.8 | 0.89 | 0.90 | 00111 |
| | MPRX#1B | 11.53 | 1.51 | 1.50 | 01101 |
| | MPRX#1C | 8.17 | 1.07 | 1.10 | 01001 |
| | WE . . . 207 | 6.1 | 0.80 | 0.80 | 00110 |

In some embodiments, a Field Strength Compliance Test may be performed that will involve a dedicated TPRX-FS. During the test the TPRX-FS will drive the TX-DUT into open feedback loop operation by continuously sending error packets, those driving the TX into operating point associated with the maximum field strength. The TPRX-FS will monitor its rectifier voltage to not exceed dangerous levels. The test may be considered being passed if after N (TBD) error packets sent, the rectifier voltage settled on some value that is below TBD level. The TPRX-FS can be based on the existing TPRX, for example TPRX#1B. No new hardware development is required.

The inventors have recognized and appreciated that receiver loading may be taken into consideration for over-voltage protection and thresholds such as the receiver voltage limit in a receiver may be made adjustable. When a receiver is loaded and is protected for over-voltage condition and the load drops off, extra voltage above the threshold can be applied to the receiver input. In some embodiments, the over-voltage condition threshold may be made adjustable (lowered) depending on receiver loading that is either directly reported from the receiver or transmitter when measured transmitted power is used to program the threshold. The transmitter loading may also change depending on coupling coefficient. In lower coupling coefficient scenarios, transmitter power consumption is somewhat higher than in strong coupling. The over-voltage protection threshold is adjusted based on coupling information that is approximated based on difference between transmitted and received power.

The wireless power transmitter 1 and wireless power receiver 11 may include a controller, such as controller 5, for performing the steps described above. Such a controller may be implemented by any suitable type of circuitry. For example, the controller may be implemented using hardware or a combination of hardware and software. When implemented using software, suitable software code can be executed on any suitable processor (e.g., a microprocessor) or collection of processors. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments described herein comprises at least one computer-readable storage medium (e.g., RAM, ROM, EEPROM, flash memory or other memory technology, or other tangible, non-transitory computer-readable storage medium) encoded with a computer program (i.e., a plurality of executable instructions) that, when executed on one or more processors, performs the above-discussed functions of one or more embodiments. In addition, it should be appreciated that the reference to a computer program which, when executed, performs any of the above-discussed functions, is not limited to an application program running on a host computer. Rather, the terms computer program and software are used herein in a generic sense to reference any type of computer code (e.g., application software, firmware, microcode, or any other form of computer instruction) that can be employed to program one or more processors to implement aspects of the techniques discussed herein.

Various aspects of the apparatus and techniques described herein may be used alone, in combination, or in a variety of arrangements not specifically discussed in the embodiments described in the foregoing description and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A wireless power receiver configured to communicate with a wireless power transmitter for receiving electrical power therefrom, the wireless power receiver comprising:
   at least one non-transitory computer-readable medium storing a limit of the wireless power receiver and a sensitivity of the wireless power receiver; and
   circuitry configured to:
   transmit the limit of the wireless power receiver and the sensitivity of the wireless power receiver to the wireless power transmitter for the wireless power transmitter to determine a signal strength limit for the wireless power transmitter; or
   receive a scaling factor from the wireless power transmitter and determine a signal strength limit for the wireless power transmitter based upon the scaling factor, the limit of the wireless power receiver and the sensitivity of the wireless power receiver, and transmit the signal strength limit for the wireless power transmitter to the wireless power transmitter.

2. The wireless power receiver of claim 1, wherein the circuitry is configured to transmit the limit of the wireless power receiver and the sensitivity of the wireless power receiver to the wireless power transmitter.

3. The wireless power receiver of claim 2, wherein the circuitry is configured to transmit the limit of the wireless power receiver and the sensitivity of the wireless power receiver to the wireless power transmitter prior to initiation of power transfer between the wireless power transmitter and the wireless power receiver.

4. The wireless power receiver of claim 1, wherein the sensitivity indicates a sensitivity of the wireless power receiver to a magnetic field.

5. The wireless power receiver of claim 4, wherein the sensitivity is represented relative to a that of a reference wireless power receiver.

6. The wireless power receiver of claim 1, wherein the wireless power receiver is configured to receive a scaling factor from the wireless power transmitter and determine a signal strength limit for the wireless power transmitter based upon the scaling factor, the limit of the wireless power receiver and the sensitivity of the wireless power receiver.

7. The wireless power receiver of claim 1, wherein the limit of the wireless power receiver and the sensitivity are stored together in a single byte.

8. The wireless power receiver of claim 1, wherein the limit is a voltage limit, a current limit or a temperature limit of the wireless power receiver.

9. A method performed by a wireless power receiver, the method comprising:
   (A) storing a limit of the wireless power receiver and a sensitivity of the wireless power receiver;
   (B) transmitting the limit of the wireless power receiver and the sensitivity of the wireless power receiver to a wireless power transmitter for the wireless power transmitter to determine a signal strength limit for the wireless power transmitter; or receiving a scaling factor from the wireless power transmitter and determining a signal strength limit for the wireless power transmitter based upon the scaling factor, the limit of the wireless power receiver and the sensitivity of the wireless power receiver, and transmitting the signal strength limit to the wireless power transmitter; and
   (C) receiving power wirelessly from the wireless power transmitter based upon the signal strength limit.

10. A wireless power transmitter configured to communicate with a wireless power receiver for transmitting electrical power thereto, the wireless power transmitter comprising:
    at least one non-transitory computer-readable medium storing a scaling factor; and
    circuitry configured to limit a signal strength of the wireless power transmitter to a value determined based on the scaling factor, a limit of the wireless power receiver and a sensitivity of the wireless power receiver.

11. The wireless power transmitter of claim 10, wherein the wireless power transmitter is configured to receive the limit of the wireless power receiver and the sensitivity of the wireless power receiver from the wireless power receiver.

12. The wireless power transmitter of claim 11, wherein the wireless power transmitter is configured to calculate the value based on the scaling factor, the limit of the wireless power receiver and the sensitivity of the wireless power receiver.

13. The wireless power transmitter of claim 11, wherein the wireless power transmitter is configured to receive the limit of the wireless power receiver and the sensitivity of the wireless power receiver prior to initiation of power transfer between the wireless power transmitter and the wireless power receiver.

14. The wireless power transmitter of claim 11, wherein the limit of the wireless power receiver and the sensitivity are received together in a single byte.

15. The wireless power transmitter of claim 10, wherein the scaling factor is represented relative to that of a reference wireless power transmitter.

16. The wireless power transmitter of claim 10, wherein the limit is a voltage limit, a current limit or a temperature limit of the wireless power receiver.

17. A method performed by a wireless power transmitter, the method comprising:
    storing a scaling factor, and
    limiting a signal strength of the wireless power transmitter to a value determined based on the scaling factor, a limit of a wireless power receiver and a sensitivity of the wireless power receiver.

* * * * *